United States Patent
Quinn

(10) Patent No.: US 7,631,265 B1
(45) Date of Patent: Dec. 8, 2009

(54) SYSTEM AND METHOD FOR CONFIGURING AND LOADING A USER INTERFACE

(75) Inventor: Bradley J. Quinn, Corona, CA (US)

(73) Assignee: Gateway, Inc., North Sioux City, SD (US)

( * ) Notice: Subject to any disclaimer, the term of this patent is extended or adjusted under 35 U.S.C. 154(b) by 500 days.

(21) Appl. No.: 09/751,520

(22) Filed: Dec. 29, 2000

(51) Int. Cl.
  *G06F 3/00* (2006.01)
(52) U.S. Cl. .................... 715/744; 715/733; 715/737; 715/740; 715/736; 715/745
(58) Field of Classification Search ............. 345/733, 345/734, 735–737, 740, 969; 709/203, 220, 709/223–224; 715/733–737, 740, 969, 220–224, 715/744, 745; 340/825
  See application file for complete search history.

(56) References Cited

U.S. PATENT DOCUMENTS

| | | | |
|---|---|---|---|
| 5,796,602 A | 8/1998 | Wellan et al. | |
| 5,802,304 A | 9/1998 | Stone | |
| 5,818,445 A | 10/1998 | Sanderson et al. | |
| 5,878,124 A | 3/1999 | Griesmer et al. | |
| 5,956,487 A | 9/1999 | Venkatraman et al. | |
| 5,973,683 A * | 10/1999 | Cragun et al. ............. | 345/719 |
| 5,974,253 A | 10/1999 | Nahaboo et al. | |
| 6,002,450 A | 12/1999 | Darbee et al. | |
| 6,032,202 A * | 2/2000 | Lea et al. ................. | 710/8 |
| 6,061,715 A | 5/2000 | Hawes | |
| 6,072,490 A | 6/2000 | Bates et al. | |
| 6,133,847 A * | 10/2000 | Yang .................... | 340/825.22 |
| 6,288,716 B1 * | 9/2001 | Humpleman et al. ....... | 345/733 |
| 6,466,971 B1 * | 10/2002 | Humpleman et al. ....... | 709/220 |
| 6,476,833 B1 * | 11/2002 | Moshfeghi ............... | 345/854 |
| 2003/0140090 A1 * | 7/2003 | Rezvani et al. ........... | 709/203 |

* cited by examiner

*Primary Examiner*—Weilun Lo
*Assistant Examiner*—Mylinh Tran
(74) *Attorney, Agent, or Firm*—Pearne & Gordon LLP

(57) ABSTRACT

The present invention is directed to a system and a method for configuring and loading a user interface. The method for configuring the user interface includes receiving user interface data from a remote device describing one or more user interface functions on the remote device. This user interface data is compared with a user interface template. A display of one or more representations is configured based on the user interface data, with each representation corresponding to one of the user interface functions on the remote device. The user is then able to interact with the display of the representations in order to utilize the user interface functions available on the remote device.

37 Claims, 9 Drawing Sheets

SYSTEM AND METHOD FOR CONFIGURING AND LOADING A USER INTERFACE

FIELD OF THE INVENTION

The present invention generally relates to user interfaces for information appliances, and particularly to, a system and a method for configuring and loading a user interface.

BACKGROUND OF THE INVENTION

The promulgation of a wide variety of information appliances and devices has enabled users to experience increased and diverse functionality in their everyday lives. However, these devices typically do not interact in a seamless manner. Rather, each device typically is designed only to interact with components of the device itself as well as with other devices specifically designed to interact with the device. Thus, users are left with a large number of disjointed systems that are difficult to operate in a seamless system. For example, a user may utilize devices such as televisions, music players, computers, personal digital assistants, and the like in the course of a typical day. Each of these devices may have a different user interface which is incompatible with the other devices. Therefore, the user must access each device separately in order to control its functions.

Additionally, the configuration of a device itself may limit the ability of the device to interact with other devices. For example, an information appliance may be configured in a "thin" manner to enable use in mobile applications. The appliance may have limited processing power and storage to prolong battery life and decrease size, have a limited network connection bandwidth, and the like. Thus, the appliance may not be suitable for intensive functions such as processing, storage, and transfer of data. The limited functionality of the information appliance may decrease the efficiency and ability of the appliance to communicate with another device. Previous user interfaces utilized to communicate between the information appliance and another device did not address the functionality of the device, thereby making communication between the appliance and the device through the user interface inefficient.

SUMMARY OF THE INVENTION

Accordingly, the present invention is directed to an improved system and an improved method for configuring and loading a user interface. In a first aspect of the present invention, the method for configuring the user interface includes receiving user interface data from a remote device describing one or more user interface functions on the remote device. This user interface data is compared with a user interface template. A display of one or more representations is then configured based on the user interface data, with each representation corresponding to one of the user interface functions on the remote device.

In a second aspect of the present invention, the method for loading a user interface includes accessing a resource on a remote device. Interaction of a user with the resource is evaluated, and the resource is identified based upon the evaluated interaction. A user interface corresponding to the identified resource is then loaded.

It is to be understood that both the foregoing general description and the following detailed description is exemplary and explanatory only and is not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 10, exemplary embodiments of the present invention are directed to a system and a method for configuring and loading a data-driven user interface. A data-driven user interface may be employed in a variety of instances. For example, an information appliance (such as a desktop computer, convergence system, digital information appliance, personal digital assistant, portable computer, and the like) may be configured as a "thin" information appliance (i.e. having limited system resources, limited network connection bandwidth, and the like), thereby making it difficult and time-intensive to perform functions such as processing and/or transfer of data. Thus, it would be desirable to enable efficient loading and transfer of a user interface so that even a thin information appliance may interact with a device in a user-friendly manner.

Figure 1:
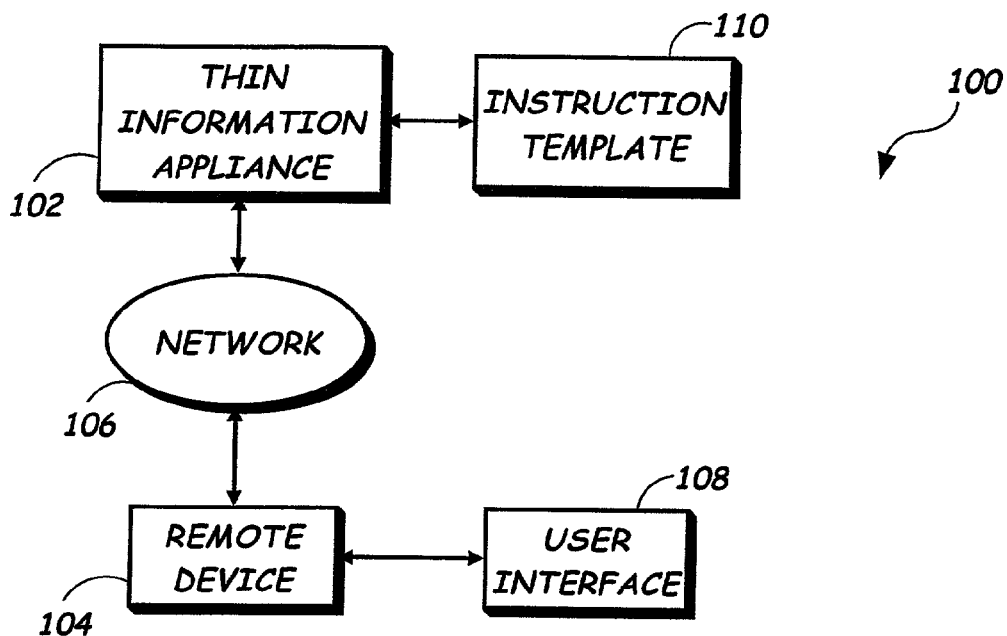
FIG. 1 is a block diagram of an exemplary embodiment of the present invention wherein an information appliance includes an instruction template suitable for being configured by data received from a remote device to provide a user interface.

Referring now to FIG. 1, an exemplary embodiment 100 of the present invention is shown wherein an information appliance 102 includes an instruction template 110 suitable for being configured by data received from a remote device 104 to provide a user interface for the remote device 104 on the information appliance 102. In the illustrated embodiment, a thin information appliance 102, such as an information appliance with limited resources and/or network connection bandwidth configured for mobile operation and the like, is connected to a remote device 104 over a network 106, such as a local area network (LAN) (including a wireless LAN), wide area network (WAN), Internet, and the like. The remote device 104 includes a user interface 108 suitable for controlling at least one function of the remote device 104. The information appliance 102 includes an instruction template 110 which provides a variety of functions that correspond to functions available on the remote device 104. Therefore, once a connection is initiated between the information appliance 102 and the remote device 104, the remote device 104 provides to the information appliance 102 data relating to particular functions of the user interface 108 on the remote device 104. This data is then utilized by the information appliance 102 to construct a user interface from the instruction template 110 and to provide functions corresponding to functions available on the remote device 104. Thus, data describing particular functions of the remote device 104, instead of the whole user interface 108 of the remote device 104, may be transferred from the remote device 104 to the information appliance 102. In this way, the data may be transferred in an expedited manner and configured utilizing a minimum of system resources.

Figure 2:
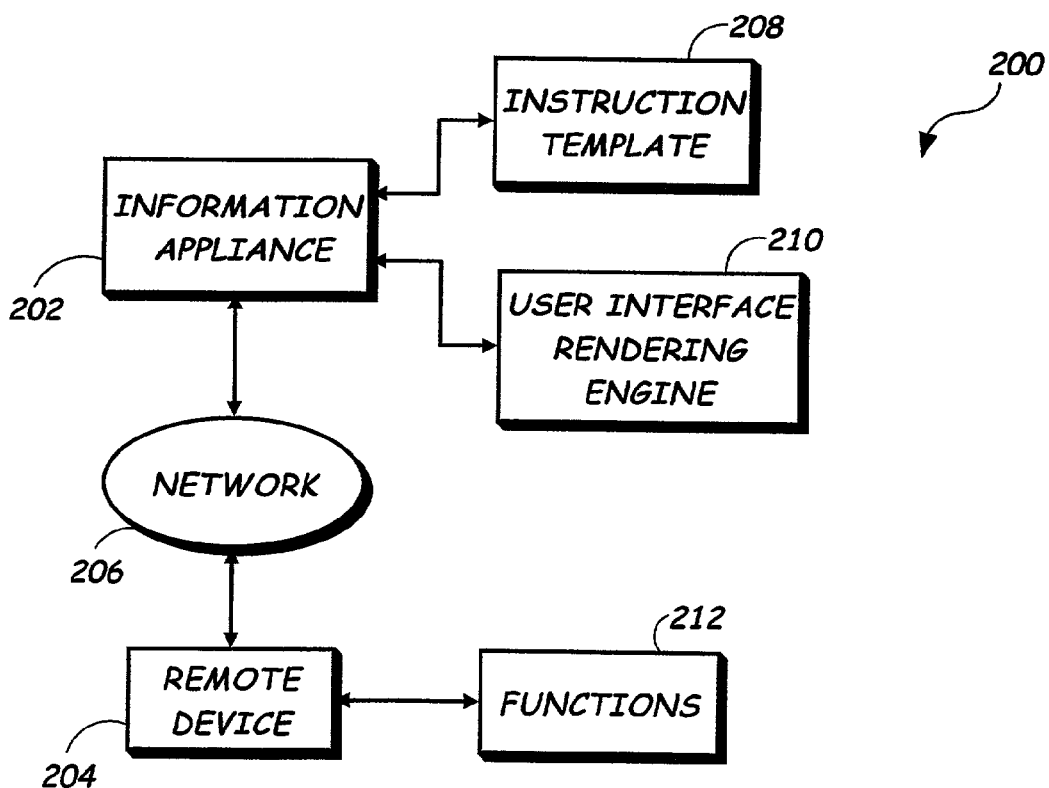
FIG. 2 is a block diagram of an exemplary embodiment of the present invention wherein an information appliance includes a user interface rendering engine suitable for configuring a user interface based on data that describes a user interface received from a remote device.

FIG. 2 shows an exemplary embodiment 200 of the present invention wherein an information appliance 202 includes a user interface rendering engine 210 suitable for configuring a user interface on the information appliance 202 based on data received from a remote device 204 describing a user interface or functions 212 of the remote device 204. In the illustrated embodiment, an information appliance 202 is connected to a remote device 204 over a network 206. The information appliance 202 includes an instruction template 208 with a user interface rendering engine 210. The user interface rendering engine 210 converts user interface data received from the remote device 204 (i.e., the data describing the functions 212 available on the remote device 204) into a user interface on the information appliance 202 which the user may utilize to interact with the remote device 204. The user interface data may be represented using open standards, such as scalable vector graphics, JavaScript, and the like as contemplated by a person of ordinary skill in the art. Thus, the data-driven user interface on the information appliance 202 may be configured dynamically, that is, the user interface may have elements added, changed and/or removed dynamically so that a classic software update does not need to be performed. This may be especially useful if the user interface is provided by a dynamic entity.

Figure 3:
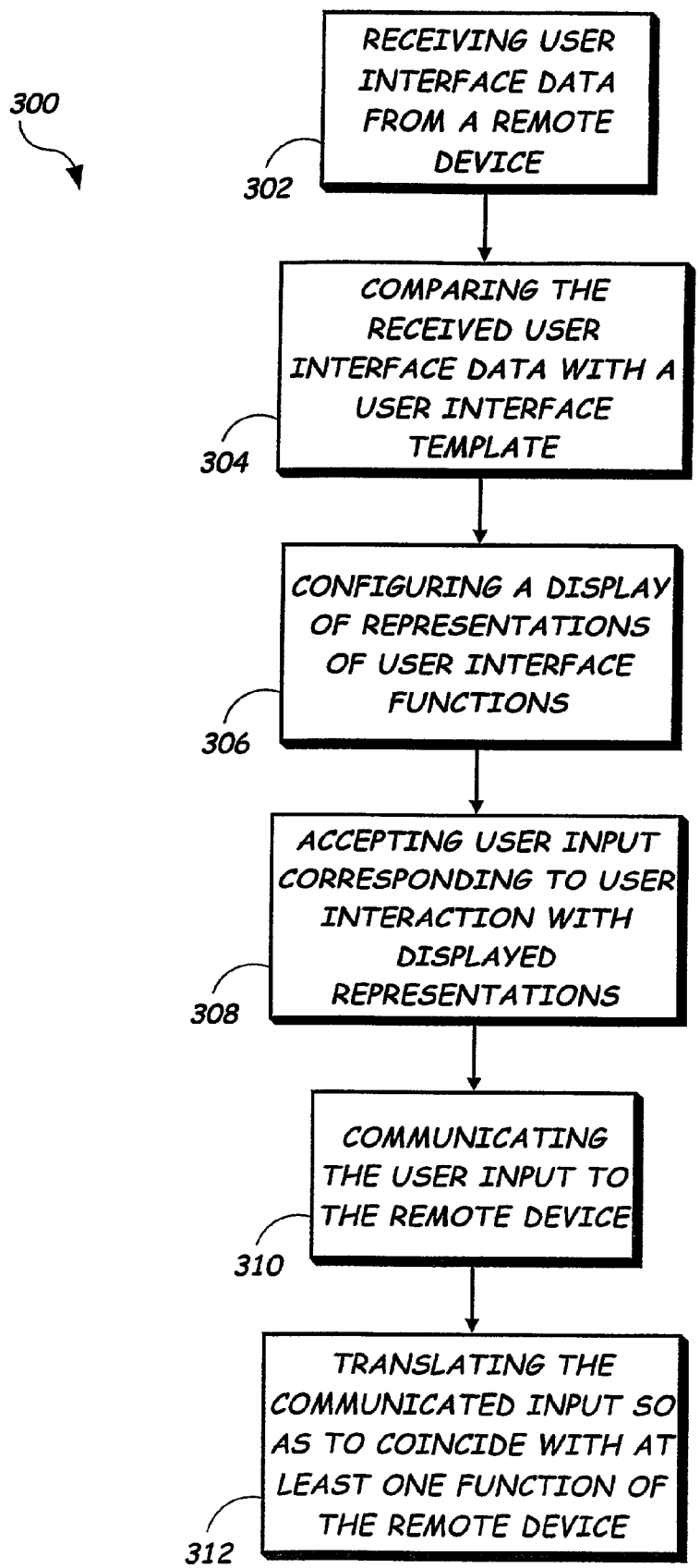
FIG. 3 is a flow diagram illustrating an exemplary method of the present invention wherein user interface data received from a remote device is compared to a user interface template to configure a user interface.

Referring now to FIG. 3, an exemplary method 300 of the present invention is shown wherein user interface data received from a remote device is compared to an instruction or user interface template to configure a user interface for the remote device on the information appliance. The user interface data (i.e., data describing functions available on the remote device) is received from the remote device at step 302, and the received user interface data is then compared with the user interface template at step 304. In step 306, a display of representations (such as icons, a user-manipulable display of data, and the like) is configured to provide user interface functions corresponding to the functions which are identified as available on the remote device based on the user interface data received from the remote device. At step 308, user input is accepted corresponding to user interaction with the displayed representations, such as clicking on an icon, moving a scroll bar, using a touch screen to utilize a display of data, and the like. In step 310, this user input is communicated to the remote device. Then in step 312, the remote device translates the communicated input so as to coincide with at least one function of the remote device. Alternatively, the input may first be translated and then communicated to the remote device, depending on system resources and design preferences. Thus, an information appliance may be utilized to perform a variety of functions for a wide range of devices.

Figure 4:
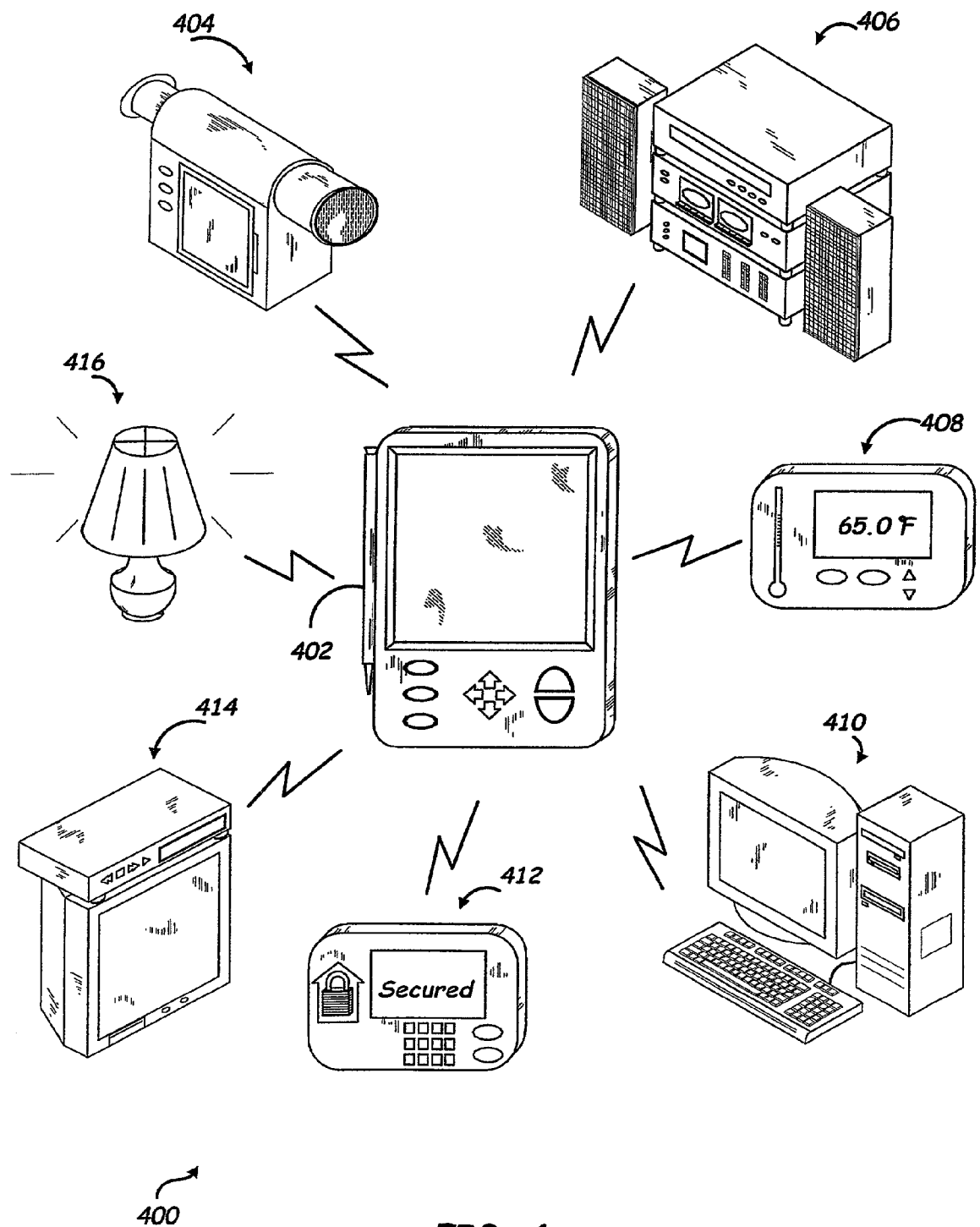
FIG. 4 is an illustration of an exemplary embodiment of the present invention wherein an information appliance configures a user interface for controlling functions on a variety of devices.

For example, as shown in the exemplary embodiment 400 depicted in FIG. 4, an information appliance 402 may configure a user interface for controlling functions on a variety of devices 404, 406, 408, 410, 412, 414, and 416. The information appliance 402, in this instance configured as a personal digital assistant, accesses and interacts with a variety of devices, such as a digital video camera 404, music player 406 (e.g., MP3 player and the like), home heating system 408, computer 410, security system 412, television and media device 414, home lighting 416, and the like. However, the information appliance 402 may be a thin information appliance, configured so as to have limited processing power, memory, limited network connection, and the like. Therefore, instead of transferring an entire user interface to enable the information appliance 402 to control the devices 404, 406, 408, 410, 412, 414, and 416, data may be sent to the information appliance 402 containing instructions on how to configure a user interface suitable for interacting with the specific functions of the devices 404, 406, 408, 410, 412, 414, and 416.

Figure 5:
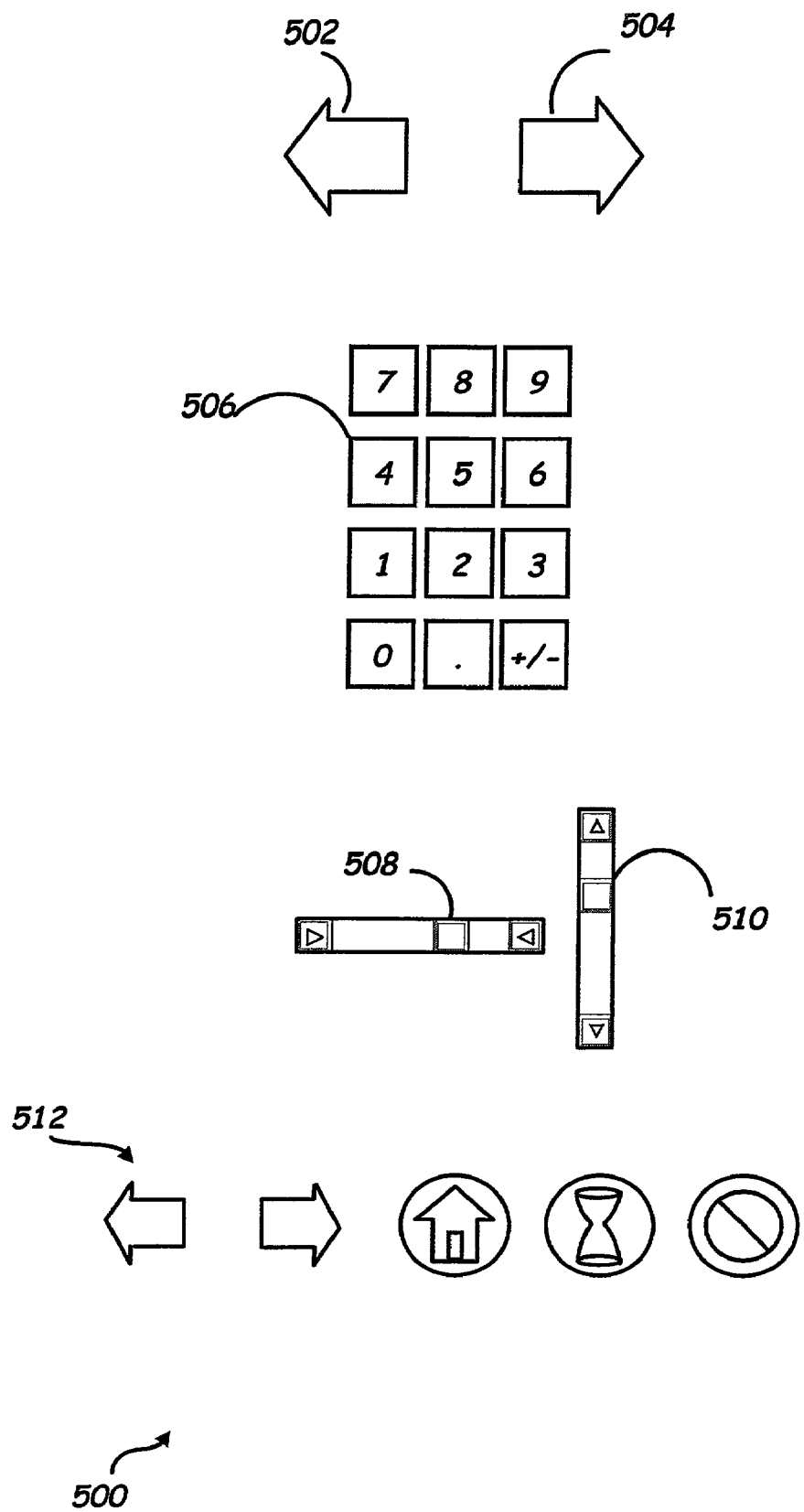
FIG. 5 is an illustration of an exemplary embodiment of the present invention wherein a variety of representations of a user interface template correspond to functions of a remote device.

In preferred embodiments of the present invention, a user interface template is provided on an information appliance that corresponds to functions available on a device. For example, FIG. 5 illustrates an exemplary embodiment 500 of the present invention wherein a variety of representations of a user interface template on an information appliance correspond to functions of a remote device. The user interface template on the information appliance may include a plurality of representations (such as a backward arrow 502, forward arrow 504, keypad 506, horizontal scroll bar 508, vertical scroll bar 510, and browsing functions 512, and the like) that may be programmed to correspond with the functions available on the remote device. For instance, the forward arrow 504 and the backward arrow 502 may be configured to scroll through images if the remote device is a digital video camera 404 (FIG. 4), to change channels if the remote device is a television 414 (FIG. 4), to change music stations if the remote device is a music player such as a stereo 406 (FIG. 4), and the like. Thus, data is received from the remote device and utilized by the information appliance to choose a representation and a corresponding function for the representation, such as viewing, selecting, and/or changing functions and/or output on the remote device.

Figure 6:
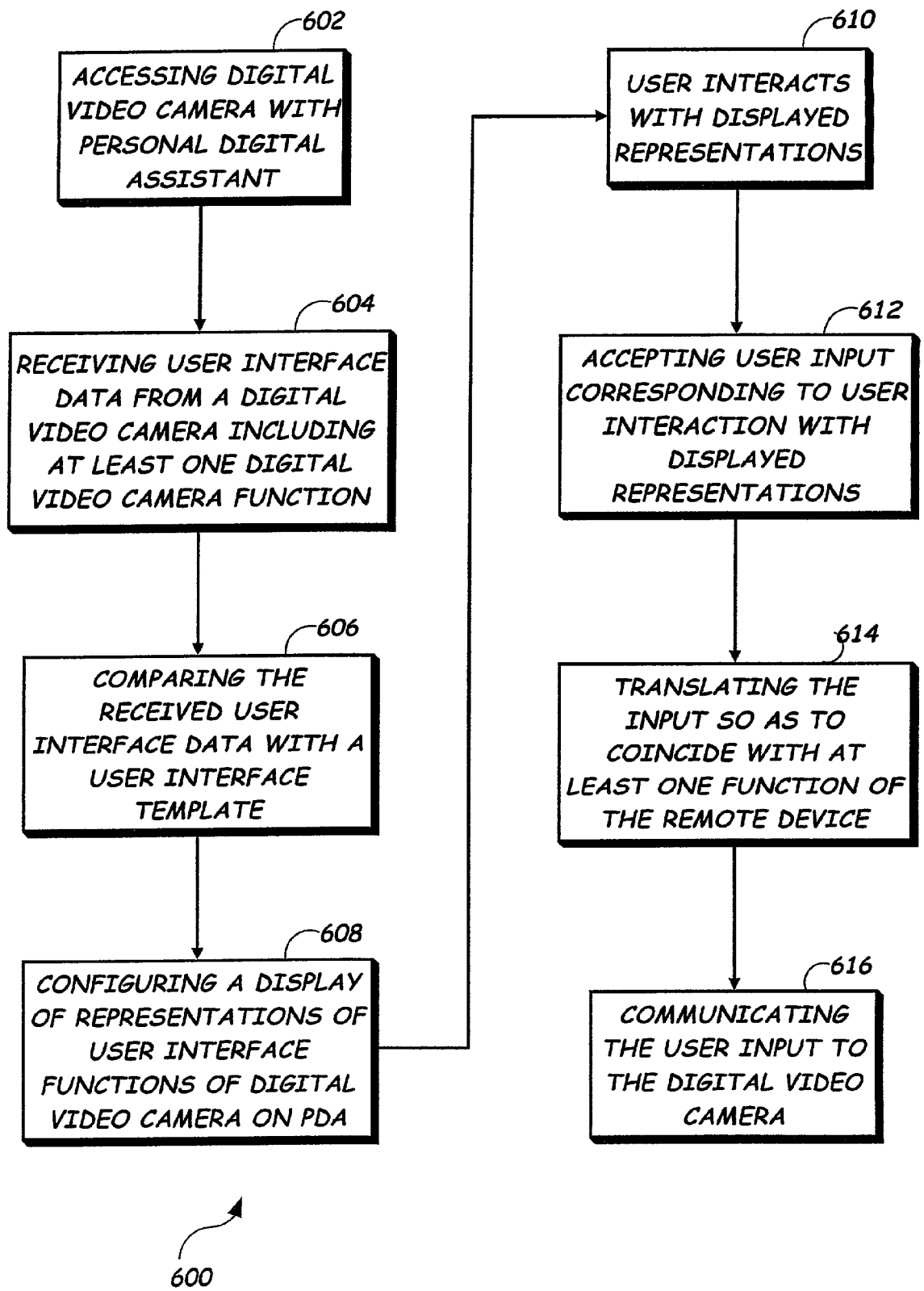
FIG. 6 is a flow diagram depicting an exemplary method of the present invention wherein a user interface to a digital video camera is provided on a personal digital assistant, the user interface suitable for controlling at least one function of the digital video camera.

Referring now to FIG. 6, an exemplary method 600 of the present invention is shown wherein a user interface to a digital video camera is provided on a personal digital assistant, the user interface suitable for controlling at least one function of the digital video camera. A digital video camera is accessed with a personal digital assistant at step 602. In step 604, user interface data from the digital video camera is received by the personal digital assistant, the user interface data including at least one digital video camera function. The received user interface data is compared with a user interface template at step 606, and a display of representations of user interface functions for the digital video camera, such as the representations shown in FIG. 5, is configured on the personal digital assistant in step 608. For example, representations may be identified and assigned functions corresponding to the functions available on the digital video camera as indicated by the user interface data received from the digital video camera. Thus, the user interacts with the representations displayed on the information appliance in step 610, and user input is accepted corresponding to the user's interactions with the displayed representations in step 612. This user input is translated so as to coincide with at least one function of the remote device at step 614, and the translated input is communicated to the digital video camera in step 616. Thus, a user interface on the personal digital assistant may be configured to control functions of the digital video camera (such as transfer images, scroll through images, and the like) based upon user interface data received from the digital video camera without requiring the transfer of the entire user interface for the digital video camera.

Figure 7:
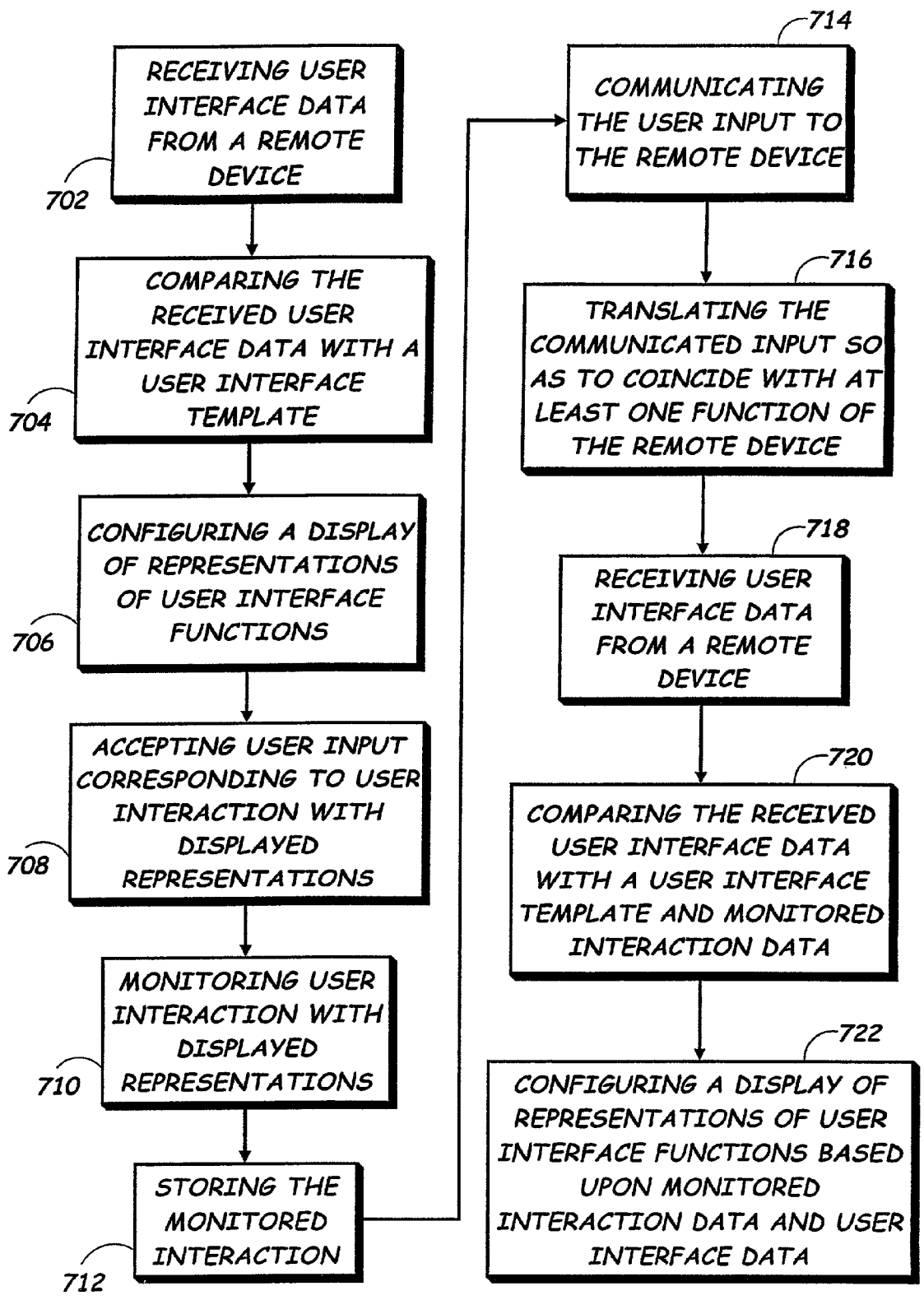
FIG. 7 is a flow diagram illustrating an exemplary embodiment of the present invention wherein user interaction with displayed representations is monitored to configure a user interface.

Referring now to FIG. 7, an exemplary embodiment 700 of the present invention is shown wherein user interaction with displayed representations is monitored to configure a user interface. A user's interaction with representations displayed on an information appliance may be utilized to configure subsequent user interfaces targeted to the user's behavior. For example, user interface data is received from a remote device at step 702 and compared with a user interface template at step 704. In step 706, a display of representations for user interface functions is configured, such as by formatting a displayed element so that user interaction with the displayed element corresponds to a function of the remote device. User input corresponding to user interaction with the displayed representations is then accepted at step 708. Additionally, user interaction with the displayed representations is monitored at step 710, and the monitored user interaction is stored, such as on the user's information appliance and/or the remote device, at step 712. The user input is communicated to the remote device in step 714, and the communicated input is translated so as to coincide with at least one function of the remote device in step 716.

Thus, when data is received from a remote device in step 718, such as the same device previously accessed or a new device not previously accessed, the received user interface data is compared with both the user interface template and the monitored interaction data in step 720. In this way, a display of representations may be configured based on both the user interface data received from the remote device and the user's previous monitored interaction data at step 722. For example, if there are certain representations not utilized by a user or utilized by the user but only for a certain amount of time or a certain number of times not exceeding a minimum threshold amount of time or number of times, no matter what the device, those representations may be configured in a separate screen of the user interface, or completely omitted. It should be apparent that there are a variety of ways contemplated by the present invention for configuring a user interface based on monitored interaction of a user without departing from the spirit and scope thereof.

Figure 8:
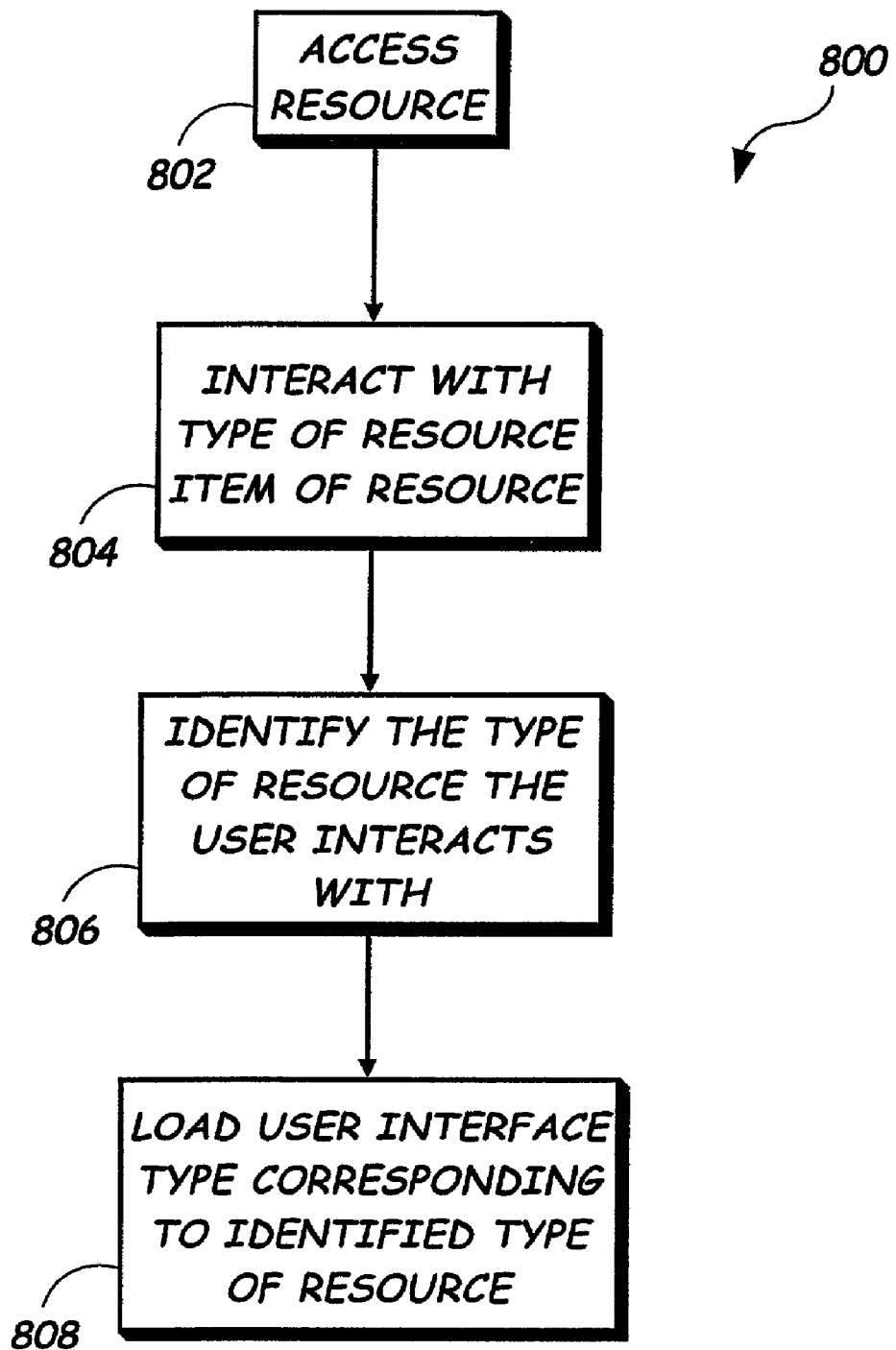
FIG. 8 is a flow diagram depicting an exemplary method of the present invention wherein a user interface is loaded based upon an accessed resource type.

FIG. 8 shows an exemplary embodiment 800 of the present invention wherein a user interface is loaded based upon an accessed resource type. To further improve the efficiency of user access to a resource, an interface may be loaded corresponding to an identified type of resource so that, upon initiation of the resource, the interface is readily accessible. For instance, a user accesses a resource in step 802, such as a web site, device, and the like. The user then interacts with a particular item available on the resource in step 804. The type of resource is identified at step 806, and a user interface type is loaded corresponding to the identified type of resource at step 808. Thus, when a user initiates the resource, a user interface corresponding to the type of resource is readily available.

Figure 9:
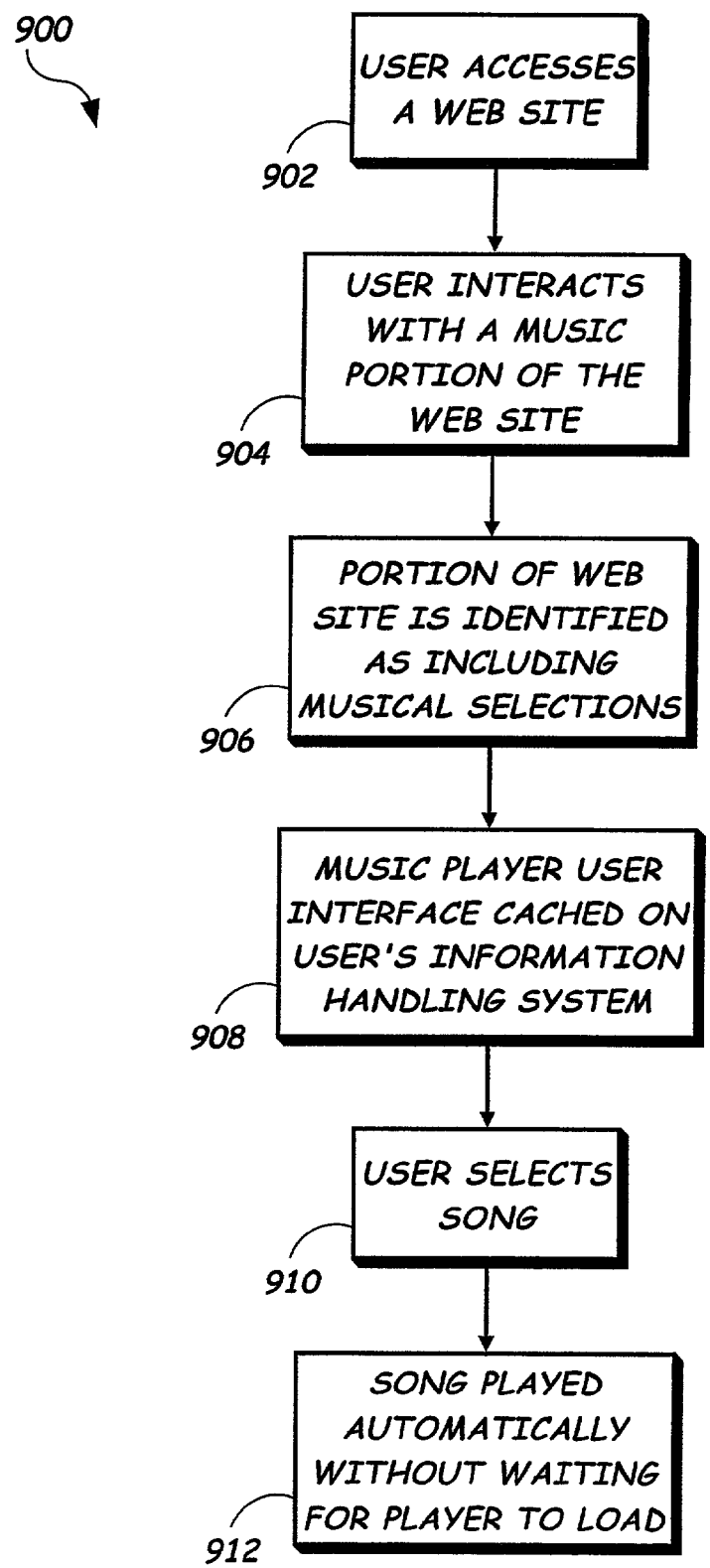
FIG. 9 is a flow diagram of an exemplary embodiment of the present invention wherein a music player user interface is loaded based upon user interaction with a song list.

For example, as illustrated in FIG. 9, an exemplary embodiment 900 of the present invention is shown wherein a music player user interface is loaded based upon user interaction with a song list. A user accesses a web site at step 902, and interacts with a music portion of the web site, such as a song list, in step 904. Subsequently, in step 906, the user interacts with a portion of the web site which is identified as including musical selections. In response to identifying the web site as including musical selections, a music player user interface is cached on the user's information handling system at step 908, such as by transferring the music player user interface over a network, reading the music player user interface into RAM from a disk drive or other local memory, and the like as contemplated by a person of ordinary skill in the art. Therefore, once the user selects a song to play in step 910, the song is played automatically without having to wait for the music player to load in step 912 because the music player was already loaded in step 908.

If the data representing the user interface is represented using an extensible markup language like XML, then caching directives may be embedded in the user interface data itself. In this way, a user interface rendering engine that understands the caching directives may make use of them, and any other rendering engine may ignore them. The caching directives may be added to the user interface data when the user interface is designed or after usability testing as desired.

Figure 10:
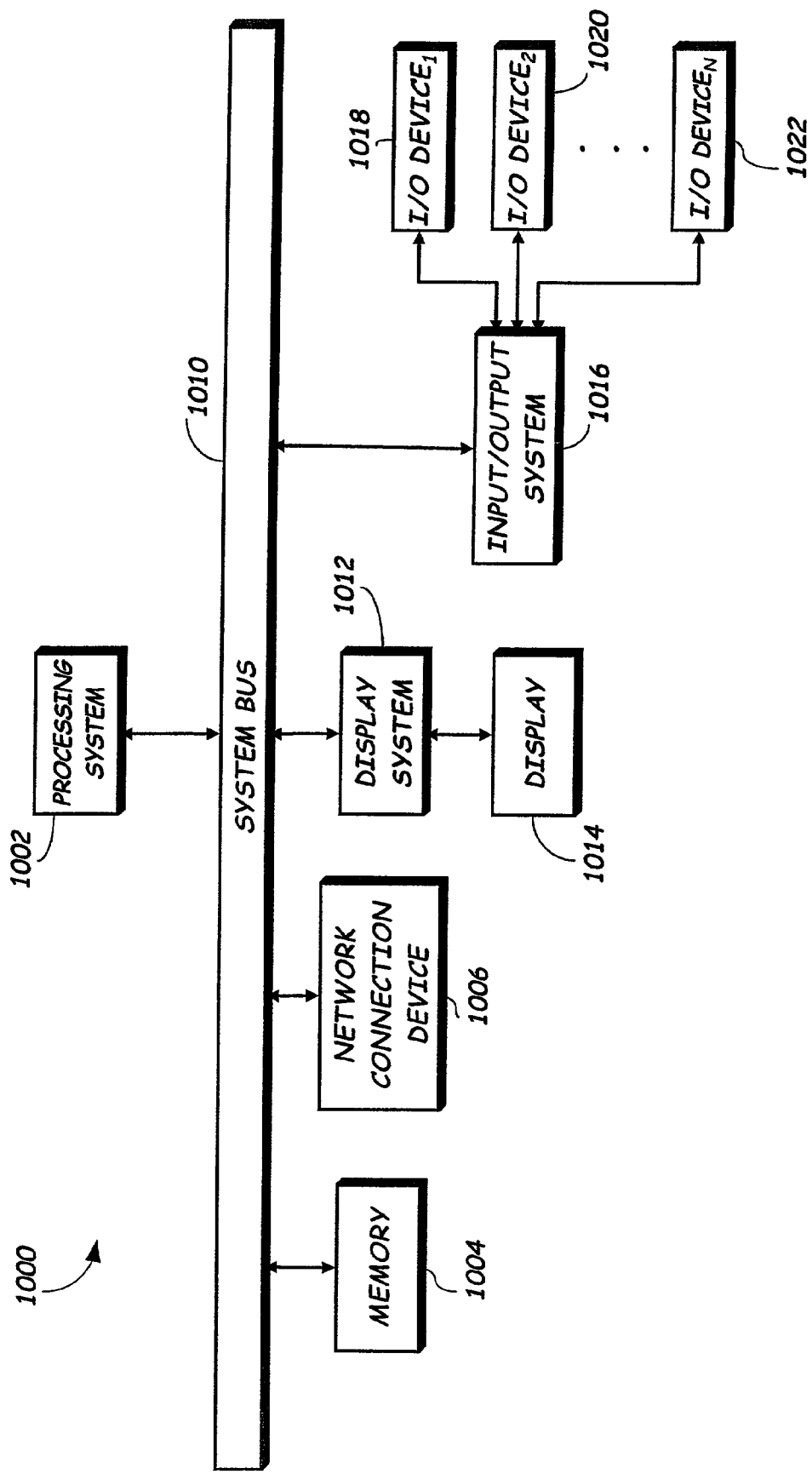
FIG. 10 is a block diagram of a hardware system operable to embody the present invention.

Referring now to FIG. 10, a hardware system in accordance with the present invention is shown. The hardware system shown in FIG. 10 is generally representative of the hardware architecture of an information appliance of the present invention. The information appliance 1000 may be a digital information appliance, convergence system, Internet appliance, and the like without departing from the spirit and scope of the present invention. A processing system 1002 controls the information appliance 1000. The processing system 1002 includes a central processing unit such as a microprocessor or microcontroller for executing programs, performing data manipulations and controlling the tasks of the information appliance 1000. Communication with the processing system 1002 may be implemented through a system bus 1010 for transferring information among the components of the information appliance 1000. The system bus 1010 may include a data channel for facilitating information transfer between storage and other peripheral components of the information appliance 1000. The system bus 1010 further provides the set of signals required for communication with processing system 1002 including a data bus, address bus, and control bus. The system bus 1010 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-600, and the like. Furthermore, the system bus 1010 may be compliant with any promulgated industry standard. For example, the system bus 1010 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI).

Additionally, the information appliance 1000 includes a memory 1004. In one embodiment, memory 1004 is provided on SIMMs (Single In-line Memory Modules), while in another embodiment, memory 1004 is provided on DIMMs (Dual In-line Memory Modules), each of which plugs into suitable sockets provided on a motherboard holding many of the other components shown in FIG. 10. Memory 1004 may include standard DRAM (Dynamic Random-Access Memory), EDO (Extended Data Out) DRAM, SDRAM (Synchronous DRAM), or other suitable memory technology. Memory 1004 may also include auxiliary memory to provide storage of instructions and data that are loaded into the memory 1004 before execution. Auxiliary memory may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM).

The information appliance 1000 further includes a network connection device 1006. The network connection device 1006 communicates between the information appliance 1000 and a remote device, such as external devices, networks, information sources, or host systems that administer a plurality of information appliances. For example, host systems such as a server or information appliance, may run software controlling the information appliance, serve as storage for an information appliance, or coordinate software running separately on each information appliance. The network connection device 1006 may provide or receive analog, digital, or radio frequency data. The network connection device 1006 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and the like), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and the like. For example, the network connection device 1006 may comprise a network adapter, a serial port, parallel port, printer adapter, modem, universal asynchronous receiver-transmitter (UART) port, and the like, or use various wireless technologies or links such as an infrared port, radio-frequency (RF) communications adapter, infrared transducers, or RF modem.

The information appliance 1000 further includes a display system 1012 for connecting to a display device 1014. The display system 1012 may comprise a video display adapter having all of the components for driving the display device, including video random access memory (VRAM), buffer, and graphics engine as desired. The display device 1014 may comprise a liquid-crystal display (LCD), or may comprise alternative type of display technologies, such as a light-emitting diode (LED) display, gas or plasma display, or employ flat-screen technology.

An information appliance 1000 may further include an input/output (I/O) system 1016 for connecting to one or more I/O devices 1018, 1020, and up to N number of I/O devices 1022. Input/output system 1016 may comprise one or more controllers or adapters for providing interface functions between one or more of I/O devices 1018-1022. For example, input/output system 1016 may comprise a serial port, parallel port, network adapter, printer adapter, radio-frequency (RF) communications adapter, universal asynchronous receiver-transmitter (UART) port, and the like, for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, and the like. It should be appreciated that modification or reconfiguration of the information appliance 1000 of FIG. 10 by one having ordinary skill in the art would not depart from the scope or the spirit of the present invention.

Although the invention has been described with a certain degree of particularity, it should be recognized that elements thereof may be altered by persons skilled in the art without departing from the spirit and scope of the invention. One of the embodiments of the invention may be implemented as sets of instructions resident in the memory 1004 of one or more information appliances configured generally as described in FIG. 10. Until required by the information appliance, the set of instructions may be stored in another readable memory device, for example in a hard disk drive or in a removable memory such as an optical disc for utilization in a CD-ROM drive, a floppy disk for utilization in a floppy disk drive, a floppy/optical disc for utilization in a floppy/optical drive, or a personal computer memory card for utilization in a personal computer card slot. Further, the set of instructions may be stored in the memory of an information appliance and transmitted over a LAN or a WAN, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or as software readable by a device. Further, it is understood that the specific order or hierarchy of steps in the methods disclosed are exemplary approaches. Based upon design preferences, it is understood that the specific order or hierarchy of steps in the method can be rearranged while remaining within the scope of the present invention. The accompanying method claims present elements of the various steps in a sample order, and are not intended to limit to the specific order or hierarchy presented.

It is believed that the system and method for configuring and loading a user interface of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of using user interface data received from a remote device to create a user interface for a thin information appliance to control the remote device from the thin information appliance, wherein the user interface is created from a user interface template stored in the thin information appliance, the method comprising:

initiating a connection between the thin information appliance and the remote device to supply the user interface data for use with the user interface template in creating the user interface, wherein said user interface template is stored in the thin information appliance prior to the initiation of said connection, and further wherein the user interface template includes a plurality of representations;

receiving in the thin information appliance the user interface data from the remote device to be controlled, wherein the user interface data describes a plurality of remote device functions performed by the remote device;

comparing the user interface data with the user interface template of the thin information appliance;

based on said comparing, determining functions available in the user interface template that correspond to each of the plurality of remote device functions described by the user interface data;

based on said determining assigning one of the plurality of representations respectively to each one of the plurality of remote device functions described by the user interface data;

creating the user interface from the user interface template by programming each of the assigned plurality of representations of the user interface for the thin information appliance to respectively control its corresponding one of the plurality of remote device functions; and storing the created user interface on the thin information appliance, the user interface including the assigned plurality of representations programmed to control the plurality of remote device functions.

2. The method as described in claim 1, wherein the user interface data describing the plurality of remote device functions does not comprise a whole of the user interface for the thin information appliance to control the remote device, thereby reducing resources usage of the thin information appliance.

3. The method as described in claim 1, wherein the plurality of representations include at least one representation selected from a group consisting of an icon, a scroll bar, a back arrow, a forward arrow, a keypad, a horizontal scrollbar, and a vertical scrollbar.

4. The method as described in claim 1, further comprising:

accepting input from a user to interact with a selected representation from among the plurality of representations; and communicating the input to the remote device through a network such that the user is able to utilize the a desired function on the remote device corresponding to the selected representation.

5. The method as described in claim 4, further comprising:

monitoring interaction of a user with the selected representation from among the plurality of representations; and storing data representative of the monitored interaction, the data representative of the monitored interaction being used to configure the display of the selected representation.

6. The method as described in claim 5, wherein the data representative of the monitored interaction includes an amount of time spent by the user interacting with the selected representation, and further wherein a display of the plurality of representations is configured to include the selected representation if said amount of time is greater than a threshold amount of time.

7. The method as described in claim 5, wherein the data representative of the monitored interaction includes a number of times spent by the user interacting with the selected representation, and further wherein a display of the plurality of representations is configured to include the selected representation if said number of time is greater than a threshold number of times.

8. The method as described in claim 1, wherein the plurality of remote device functions of the remote device include at least one selected from a group consisting of viewing remote device interface functions, viewing a remote device output, selecting the remote device interface functions, selecting the remote device output, changing the remote device interface functions, and changing the remote device output.

9. The method as described in claim 1, further comprising:

identifying a resource on the remote device with which a user interacts; and loading a user interface representation corresponding to the identified resource.

10. The method as described in claim 1, further comprising:

using a rendering engine of the thin information appliance to configure the user interface based on said user interface data received.

11. The method as described in claim 1, wherein the remote device is a first remote device, the user interface is a first user interface, and the user interface data is first user interface data, the method further comprising:

creating a second user interface for said thin information appliance to control a second remote device, the second user interface being created from said user interface template of said thin information appliance based on second user interface data received from the second remote device.

12. A thin information appliance configured to receive user interface data from a remote device to create a user interface for the thin information appliance to control the remote device from the thin information appliance, wherein the user interface is created from a user interface template stored in the thin information appliance, the thin information appliance comprising:

network connection means for initiating a connection between the thin information appliance and the remote device to provide the user interface data from the remote device to be controlled to the thin information appliance, wherein the user interface data describes a plurality of remote device functions performed by the remote device, said user interface data being configured for use with the user interface template to create the user interface;

a memory configured to store logic for comparing the user interface data with the user interface template of the thin information appliance;

the memory also being configured to store logic for determining functions available in the user interface template that correspond to each of the plurality of remote device functions described by the user interface data based on said logic for comparing;

the memory further being configured to store logic for assigning one of a plurality of representations respectively to each one of the plurality of remote device functions described by the user interface data based on said logic for determining; and a processor configured create the user interface from the user interface template by programming each of the assigned plurality of representations of the user interface for the thin information appliance to respectively control its corresponding one of the plurality of remote device functions;

wherein the user interface template is stored in the memory of the thin information appliance prior to the initiation of said connection, the user interface including the assigned plurality of representations programmed to control the plurality of remote device functions.

13. The thin information appliance as described in claim 12, wherein the user interface data describing the plurality of remote device functions does not comprise a whole of the user interface for the thin information appliance to control the remote device, thereby reducing resources usage of the thin information appliance.

14. The thin information appliance as described in claim 12, wherein the plurality of representations include at least one representation selected from a group consisting of an icon, a scroll bar, a back arrow, a forward arrow, a keypad, a horizontal scrollbar, and a vertical scrollbar.

15. The thin information appliance as described in claim 12, further comprising:

logic for accepting input corresponding to the interaction by the user with a selected one of the representations; and logic for communicating the input to the remote device through the network such that the user is able to utilize the user interface function on the remote device corresponding to the selected representation.

16. The thin information appliance as described in claim 12, further comprising:

logic for monitoring the interaction of the user with the display of the at least one representation; and logic for storing data representative of the monitored interaction, the monitored interaction data capable of being used to configure the display of the at least one representation.

17. The thin information appliance as described in claim 12, wherein said memory is further configured to store a rendering engine of the thin information appliance suitable for configuring the user interface based on said user interface data received.

18. The thin information appliance as described in claim 12, wherein the remote device is a first remote device, the user interface is a first user interface, and the user interface data is first user interface data;

wherein said memory is further configured to store logic for creating a second user interface for said thin information appliance to control a second remote device, the second user interface being created from said user interface template of said thin information appliance based on second user interface data received from the second remote device.

19. A storage medium readable by a thin information appliance and having instructions encoded thereon for causing the thin information appliance to perform steps of a method of receiving user interface data from a remote device to create a user interface for controlling the remote device from the thin information appliance, wherein the user interface is created from a user interface template stored in the thin information appliance, the instructions stored on the storage medium comprising the steps of:

initiating a connection between the thin information appliance and the remote device to supply the user interface data for use with the user interface template in creating the user interface, wherein said user interface template is stored in the thin information appliance prior to the initiation of said connection, and further wherein the user interface template includes a plurality of representations;

receiving in the thin information appliance the user interface data from the remote device to be controlled, wherein the user interface data describes a plurality of remote device functions performed by the remote device;

comparing the user interface data with the user interface template of the thin information appliance;

based on said comparing, determining functions available in the user interface template that correspond to each of the plurality of remote device functions described by the user interface data;

based on said determining, assigning one of the plurality of representations respectively to each one of the plurality of remote device functions described by the user interface data;

creating the user interface from the user interface template by programming each of the assigned plurality of representations of the user interface for the thin information appliance to respectively control its corresponding one of the plurality of remote device functions; and storing the created user interface on the thin information appliance, the user interface including the assigned plurality of representations programmed to control the plurality of remote device functions.

20. The storage medium as described in claim 19, wherein the user interface data describing the plurality of remote device functions does not comprise a whole of the user interface for the thin information appliance to control the remote device, thereby reducing resources usage of the thin information appliance.

21. The storage medium as described in claim 19, wherein the plurality of representations include at least one representation selected from a group consisting of an icon, a scroll bar, a back arrow, a forward arrow, a keypad, a horizontal scrollbar, and a vertical scrollbar.

22. The store medium as described in claim 19, the instructions store on the storage medium comprising the steps of:

accepting input corresponding to the interaction by the user with a selected representation from the plurality of representations; and communicating the input to the remote device through a network such that the user is able to utilize the user interface function on the remote device corresponding to the selected representation.

23. The storage medium as described in claim 22, wherein the input includes at least one of selecting an icon, manipulating a scroll bar, inputting a data set, and interacting with a representation of a user interface function on the remote device.

24. The storage medium as described in claim 19, the instructions stored on the storage medium comprising the steps of:

using a rendering engine of the thin information appliance to configure the user interface based on said user interface data received.

25. The storage medium as described in claim 19, wherein the remote device is a first remote device, the user interface is a first user interface and the user interface data is first user interface data, the instructions stored on the storage medium comprising the steps of:
   creating a second user interface for said thin information appliance to control a second remote device, the second user interface being created from said user interface template of said thin information appliance based on second user interface data received from the second remote device.

26. A method of configuring a user interface on a thin information appliance for controlling a remote device, the user interface being created based on a user interface template stored in the thin information appliance and configured from received user interface data, the method comprising:
   accessing a resource on the remote device through a network;
   evaluating interaction of a user with the resource;
   identifying the resource based on the evaluated interaction; and
   initiating a connection between the thin information appliance and the remote device to supply the user interface data for use with the user interface template in creating the user interface, wherein said user interface template is stored in the thin information appliance prior to the initiation of said connection, and further wherein the user interface template includes a plurality of representations;
   comparing the user interface data with the user interface template of the thin information appliance;
   based on said comparing determining functions available in the user interface template that correspond to each of the plurality of remote device functions described by the user interface data;
   based on said determining, assigning one of the plurality of representations respectively to each one of the plurality of remote device functions described by the user interface data;
   creating the user interface from the user interface template by programming each of the assigned plurality of representations of the user interlace for the thin information appliance to respectively control its corresponding one of the plurality of remote device functions; and
   storing the created user interface on the thin information appliance, the user interface including the assigned plurality of representations programmed to control the plurality of remote device functions.

27. The method as described in claim 26, wherein the user interface data describing the plurality of remote device functions does not comprise a whole of the user interface for the thin information appliance to control the remote device, thereby reducing resources usage of the thin information appliance.

28. The method as described in claim 26, further comprising:
   accepting input corresponding to the interaction by the user with a selected representation from the plurality of representations; and
   communicating the input to the remote device through a network such that the user is able to utilize the user interface function on the remote device corresponding to the selected representation.

29. The method as described in claim 26, wherein the input includes at least one of selecting an icon, manipulating a scroll bar, inputting a data set, and interacting with a representation of a user interface function on the remote device.

30. The method as described in claim 26, further comprising:
   using a rendering engine of the thin information appliance to configure the user interface based on said user interface data received.

31. The method as described in claim 26, wherein the remote device is first remote device, the user interface is a first user interfaces and the user interface data is first user interface data, further comprising:
   creating a second user interface for said thin information appliance to control a second remote device, the second user interface being created from said user interface template of said thin information appliance based on second user interface data received from the second remote device.

32. A system for configuring a user interface on a thin information appliance for controlling a remote device, the user interface being created based on a user interface template stored in the thin information appliance and configured from received user interface data, the system comprising:
   a communications network configured to provide a connection between the thin information appliance and the remote device to supply the user interlace data for use with the user interface template in creating the user interface, wherein said user interface template is stored in the thin information appliance prior to the initiation of said connection, and further wherein the user interface template includes a plurality of representations;
   the remote device comprising:
      equipment capable of connecting to the communications network; and
      a plurality of remote device functions: and
   the information appliance comprising:
      equipment configured to provide at least intermittent connection between the thin information appliance and the remote device through the communications network;
      logic capable of receiving through the communications network the user interface data describing the plurality of remote device functions of the remote device;
      logic capable of comparing the user interface data with the user interface template of the thin information appliance;
      logic capable of determining functions available in the user interface template that correspond to each of the plurality of remote device functions described by the user interface data based on said logic for comparing;
      logic capable of assigning one of the plurality of representations respectively to each one of the plurality of remote device functions described by the user interlace data based on said logic for determining;
      logic capable of creating the user interface from the user interface template by programming each of the assigned plurality of representations of the user interface for the thin information appliance to respectively control its corresponding one of the plurality of remote device functions; and
      logic capable of storing the created user interface on the thin information appliance, the user interface including the assigned plurality of representations programmed to control the plurality of remote device functions.

33. The system as described in claim 32, wherein the user interface data describing the plurality of remote device functions does not comprise a whole of the user interface for the thin information appliance to control the remote device, thereby reducing resources usage of the thin information appliance.

34. The system as described in claim 32, further comprising:
   accepting input corresponding to the interaction by the user with a selected representation from the plurality of representations; and
   communicating the input to the remote device through a network such that the user is able to utilize the user interlace function on the remote device corresponding to the selected representation.

35. The system as described in claim 34, wherein the input includes at least one of selecting an icon, manipulating a scroll bar, inputting a data set, and interacting with a representation of a user interface function on the remote device.

36. The system as described in claim 32, wherein the thin information appliance comprises:
   a rendering engine suitable for configuring the user interface based on said user interface data received.

37. The system as described in claim 32, wherein the remote device is a first remote device, the user interface is a first user interfaces and the user interface data is first user interface data, the thin information appliance comprising:
   logic capable of creating a second user interface for said thin information appliance to control a second remote device, the second user interface being created from said user interface template of said thin information appliance based on second user interface data received from the second remote device.

* * * * *